April 2, 1946.  A. W. BEAN  2,397,590
APPARATUS FOR DISTRIBUTING SEED OR POWDERED AND
LIKE MATERIALS ON THE GROUND
Filed May 9, 1944
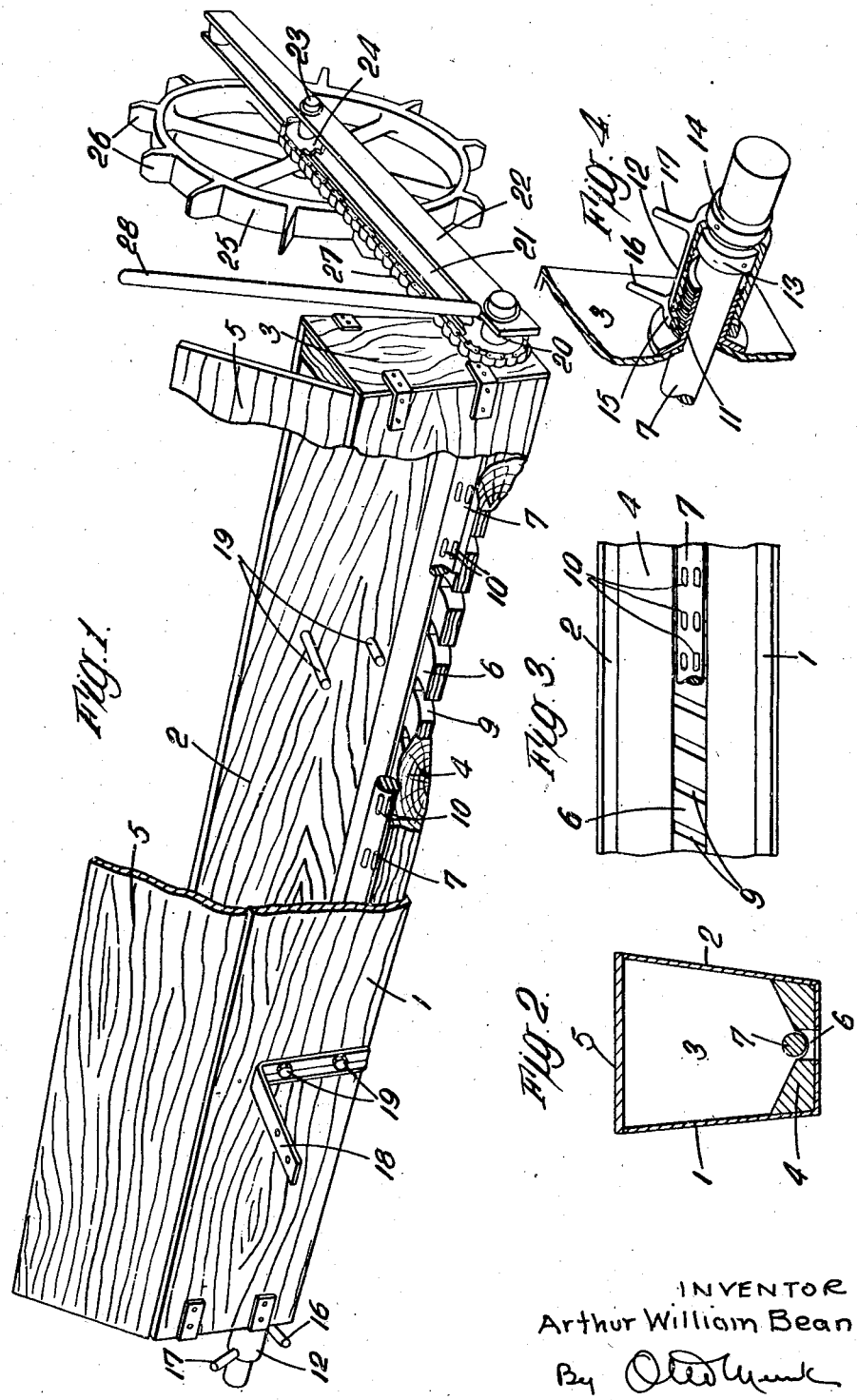
INVENTOR
Arthur William Bean
By
his ATT'Y.

Patented Apr. 2, 1946

2,397,590

UNITED STATES PATENT OFFICE 2,397,590

APPARATUS FOR DISTRIBUTING SEED OR POWDERED AND LIKE MATERIALS ON THE GROUND

Arthur William Bean, Brough, England

Application May 9, 1944, Serial No. 534,822
In Great Britain April 19, 1943

3 Claims. (Cl. 222—274)

This invention relates to apparatus for distributing seed or powdered and like materials on the ground.

Each year large tracts of land have to be sown with grass or clover seed and this operation is lengthy and tedious as first of all the ground must be prepared, then sown and finally rolled. The farmer must, therefore, traverse the area to be sown with a fluted roller, then traverse the ground again to sow the seed, and traverse the ground a third time to roll in the seed. To sow the seed it is customary to employ a fiddle drill which may result in patches of ground being unsown and is furthermore such that it cannot be used in windy weather.

The principal object of the present invention is to provide readily portable apparatus more particularly for agricultural uses for evenly distributing small seed such as grass and clover seed or powdered material such as fertilizer evenly over the ground, which is also capable of other uses such as sanding tarred roads, whereby repeated traversing of the ground is avoided and the necessity of waiting for still weather eliminated.

A further object of the invention is to provide such apparatus which may be simply and easily adjusted for varying the quantity of seed or powdered and like materials delivered during use thereof.

The above and other objects of the invention will be apparent from the following description.

The apparatus according to the present invention comprises a hopper having delivery slots in the base thereof, a shaft having a plurality of recesses therein, which is arranged to overlie the delivery slots, and means for rotating the shaft whereby seeds or powdered and like material in the hopper will be collected by the recesses in the shaft, and discharged by gravity through the delivery slots, on rotation of the shaft. The means for rotating the shaft conveniently comprises a wheel which normally engages the ground and is adapted to rotate the shaft.

According to a further feature of the invention the hopper is displaceable relative to the shaft in axial direction to vary the extent of registry of the recesses with the delivery slots and hence vary the amount of seed or powdered material delivered at each rotation of the shaft.

The slots at the base of the hopper are preferably disposed at an angle to the axis of the recessed shaft whilst the recesses lie parallel to the shaft axis.

In order that the invention may be clearly understood and readily carried into effect, a preferred embodiment is hereinafter more fully described with reference to the accompanying drawing which is given for purposes of illustration only and not of limitation.

In the drawing:

Figure 1 is a perspective view with parts broken away to show the internal construction;

Figure 2 is a transverse section through the apparatus;

Figure 3 is a plan view looking down on a portion of the hopper, and

Figure 4 is a perspective part sectional view of the means for adjusting the hopper with respect to the recessed shaft in axial direction.

Referring now to the said drawing and in particular to Figure 1, the apparatus comprises a hopper having side walls 1, 2, end walls 3 and a base 4. The hopper is also desirably provided with a hinged lid 5 or the equivalent. The base 4 has its inner surface sloping towards a curved recess 6 which extends throughout the length thereof and in this recess rotates a shaft 7 which extends through the end walls 3 where suitable bearings are provided. At the base of the recess there is provided a plurality of slots 9 which preferably are inclined with respect to the shaft 7 (see Figure 3). In the shaft 7 a number of recesses 10 are formed parallel to the axis of the shaft and the number of these recesses corresponds to the number of slots 9. The widths of the slots 9 are preferably substantially equal to the lengths of the recesses 10, whilst the spaces between the slots are longer than the lengths of the recesses 10. In this way by displacement of the shaft axially, the recesses 10 may be brought into a greater or lesser degree of registration with the slots 9.

To achieve this relative adjustment of the shaft 7 with respect to the hopper, the one end of the shaft 7 extends out through an end wall 3 to be rotatably supported in an externally threaded and flanged sleeve 11, the flange of which is made fast to the end wall 3 (see Figure 4). An internally threaded sleeve 12 engages the sleeve 11 and has an inturned flange at its outer end which flange is located between collars 13, 14 fast on the shaft 7. Also on the sleeve 11 is an internally threaded ring 15 provided with a radially projecting handle 16. A similar radially projecting handle 17 is provided on the sleeve 12. Rotation of the sleeve 12 by means of the handle 17 causes the sleeve 11 to telescope therein to a greater or lesser extent, according to the direction of rotation, and—as the flange of the sleeve 11 is made fast to the end wall 3 and the sleeve 12 is incapable of axial movement relative to the shaft 7 due to its flange engaging between the collars 13, 14—the shaft 7 is moved axially with respect to the hopper so that the recesses 10 therein register to a greater or lesser degree with the slots 9 as may be desired. The sleeves 11, 12 are locked in their adjusted position by tightening the ring 15 onto the end of the sleeve 12 so that it acts as a lock-nut.

With the hopper loaded with seed such as grass seed or clover seed or with powdered material such as powdered fertilizer or sand, and during rotation of the shaft 7 the recesses 10 therein will collect quantities of the seed or powdered or other material and allow them to be discharged by gravity through the slots 9. With the recesses in complete registry with the slots 9 there will be a maximum discharge whilst with the recesses out of registry with the slots they will be blanked by the spaces between the slots and there will be no delivery. Naturally adjustment may be made to any desired extent between maximum and minimum.

The recessed shaft 7 may be rotated in any convenient manner as by connecting it to a rotating part or by mounting wheels on the ends of shaft 7 whereby the shaft will be rotated as the apparatus is pushed or pulled over the ground. It is preferred, however, to mount the apparatus on a tractor, roller or other vehicle for which purpose brackets 18 are provided which are attached to the wall of the hopper by bolts 19, and desirably these bolts extend through to the opposite wall 2 when the bracket 18 may extend round underneath the hopper and up the opposite side wall, when on the end of the shaft 7 opposite to that provided with the adjusting means there is made fast a chain wheel 20 situated between a pair of spaced metal bars 21, 22 loosely journalled on the shaft. A shaft 23 journalled in the bars 21, 22 has fast thereon, intermediate the bars 21, 22, a chain wheel 24 and also a wheel 25 which is preferably provided with spades or projecting portions 26. Then, as the vehicle to which the apparatus is attached moves over the ground, the wheel 25 will be caused to rotate with rotation of the chain wheel 24 which is conveyed to the chain wheel 20 by an endless chain 27. As the spaced bars 21, 22 may pivot about the axis of the shaft 7 the wheel 25 will always engage the ground irrespective of irregularities in the contour of the ground.

There is made fast to one of the bars 21, 22 a rod 28 which is situated near the pivot point of the bars 21, 22. If it is desired to interrupt the drive on the shaft 7, the bars 21, 22 are rocked to lift the wheel 25 clear of the ground by pulling or otherwise applying effort to the rod 28 to bring about the pivotal movement of the bars 21, 22.

The apparatus described above is intended for agricultural purposes for the controlled even distribution of small seeds such as grass and clover seeds over the ground. The apparatus is conveniently mounted on a tractor, or behind a flanged roller, such as is customarily used for preparing ground for sowing, or between such roller and a smoothing roller such as is used to roll in distributed seed. It will thus be understood that the ground may be prepared, sown and smoothed at a single traverse. In addition to its use for agricultural purposes, the apparatus is also useful for distributing sand on tarred roads, particularly when using a mechanical spray when the apparatus may be mounted on the mechanical spraying vehicle.

I claim:

1. In apparatus for distributing seed and powdered materials on the ground, a hopper having a semi-circular groove along its bottom, a rotatable shaft in said groove, a number of parallel recesses in the periphery of said shaft at spaced intervals, a corresponding number of inclined slots cut in the base of said groove and spaced at intervals longer than the length of said recesses, means for adjusting the axial disposition of said shaft, and means for rotating said shaft.

2. In apparatus for distributing seed and powdered materials on the ground, a hopper having a groove along its bottom, a rotatable shaft in said groove, a number of recesses in said shaft at spaced intervals, a corresponding number of apertures in said groove spaced at intervals longer than the length of said recesses, means for adjusting the axial disposition of said shaft, and means for rotating said shaft.

3. Apparatus for distributing seed or powdered and like materials on the ground comprising a hopper having delivery slots in the base thereof, a shaft having a plurality of recesses therein, said shaft being arranged to overlie the delivery slots, bearings on said hopper to support said shaft for rotation about an axial displacement along its own axis and to prevent movements of said shaft at right angles to its own axis, means for adjusting said shaft relative to the hopper in axial direction to vary the extent of registry of the recesses in the shaft with the delivery slots, and means for rotating the shaft whereby the seeds or powdered and like material in the hopper will be collected by the recesses in the shaft during rotation and be discharged by gravity through the delivery slots in amounts dependent on the degree of registry of the recesses with the slots.

ARTHUR WILLIAM BEAN.